April 28, 1931.  W. R. BASSICK  1,802,454
DRIVING MECHANISM
Filed Aug. 4, 1927  2 Sheets-Sheet 1
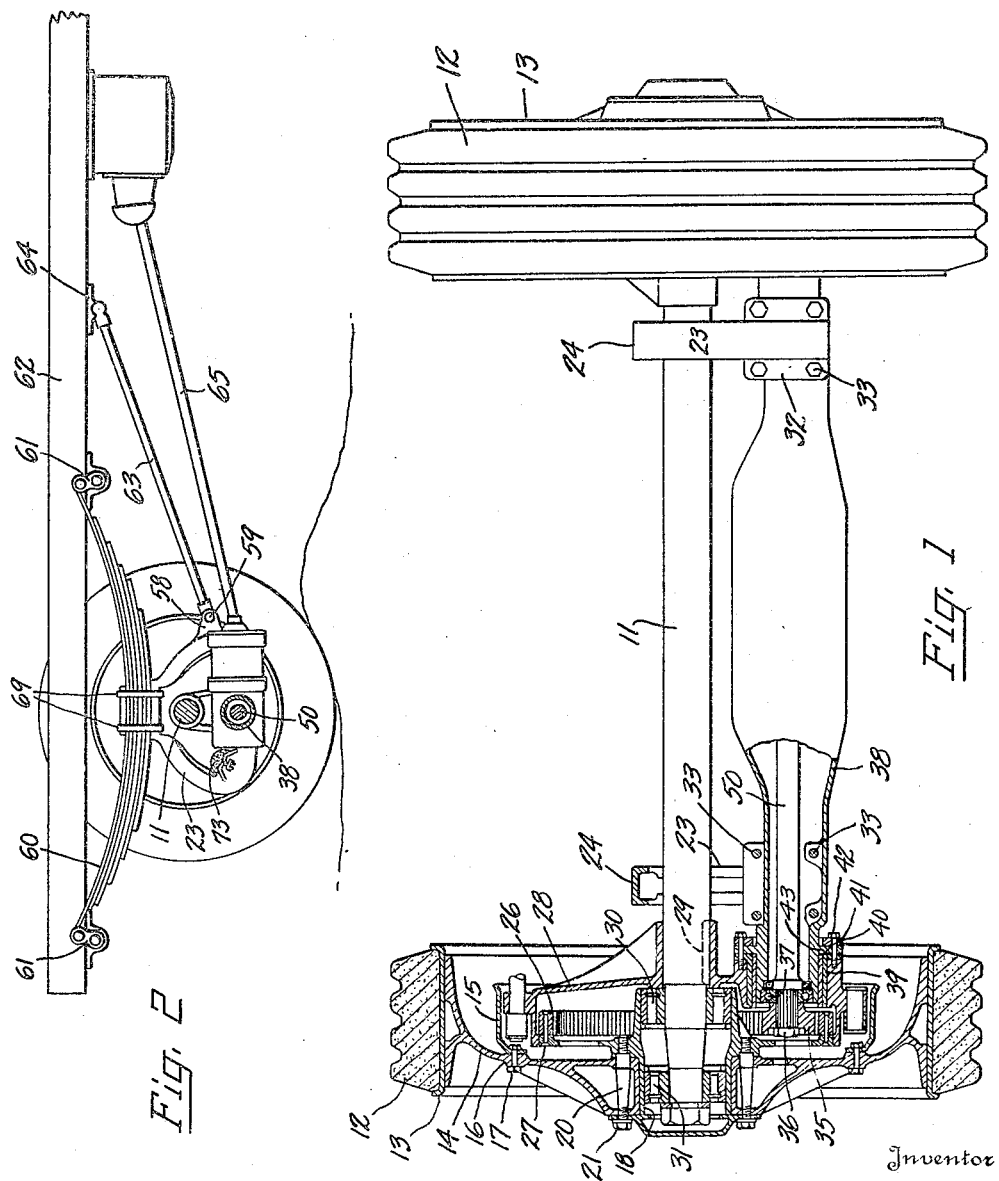
Inventor
William R. Bassick
By Irving Harness
Attorney

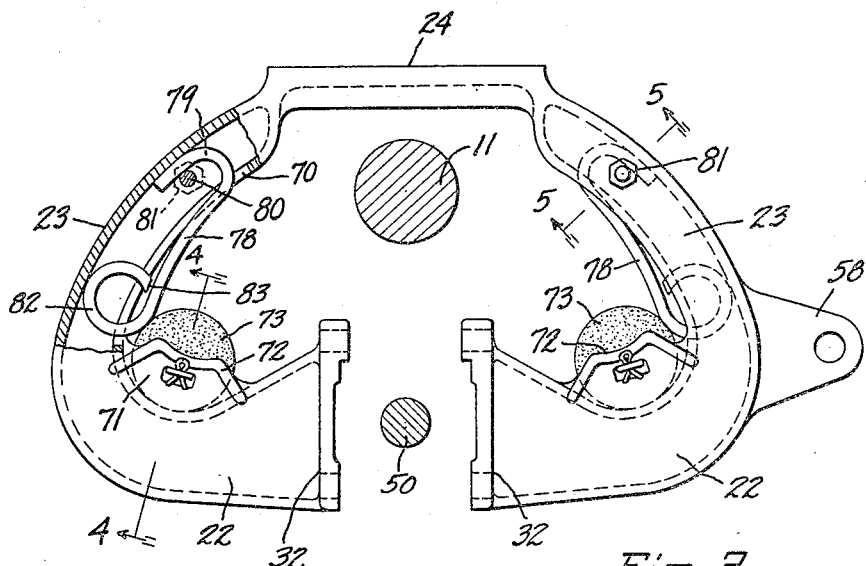
Fig. 3
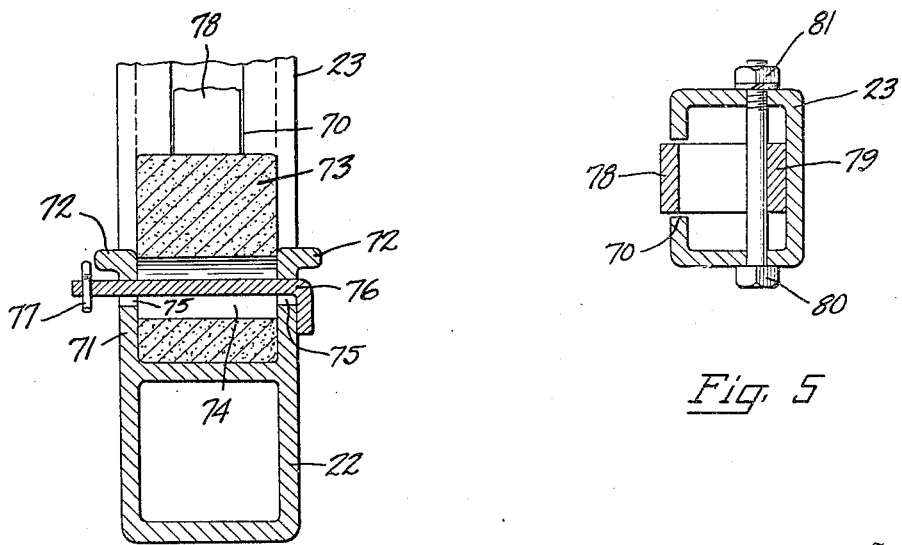
Fig. 4
Fig. 5
Inventor
William R. Bassick
By Irving Harness
Attorney Patented Apr. 28, 1931

1,802,454

UNITED STATES PATENT OFFICE

WILLIAM R. BASSICK, OF WABASH, INDIANA, ASSIGNOR TO RELAY MOTOR PRODUCTS CORPORATION, A CORPORATION OF DELAWARE

DRIVING MECHANISM

Application filed August 4, 1927. Serial No. 210,517.

This invention relates to driving mechanism for motor vehicles wherein the weight of the vehicle together with its load may be utilized to assist the forward and rearward rotation of the driving wheels in addition to the torque delivered to the driving wheels from the source of motive power.

This invention more specifically deals with means for resisting the swinging movement of the axle housing whereby the same in swinging will be gradually brought to an easy stop, and will normally be prevented from contacting against its limiting stops in such a manner as to cause a violent shock or readily audible sound.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several views,—

Fig. 1 is a rear elevation, partly in section, of the entire axle construction of a motor vehicle, including the wheels and tires.

Fig. 2 is a side elevation of the rear portion of a vehicle chassis with the near wheel removed to disclose the relative location of the axle elements in their normal position.

Fig. 3 is an elevation of one of the spring perches, partly in section, illustrating the position of the main and auxiliary axle bumpers in respect thereto, the normal position of the wheel axle and the drive axles being illustrated in connection with the same.

Fig. 4 is a sectional view taken on line 4—4 of Fig. 3.

Fig. 5 is a sectional view taken on line 5—5 of Fig. 3.

In the drawings, 11 is the wheel carrying axle which may be constructed in one solid piece throughout its length, or may take the form of two stub axles instead of the solid shaft, when desired. The ends of the wheel carrying axle 11 are mounted in antifriction bearings 30 and 31, and on these bearings the hub 18 rotates. The wheel body 14 is mounted on the hub 18 and is held securely thereto by the stud bolts 20 and nuts 21. On the wheel body 14 is mounted the rim 13 which in turn carries a tire 12. The brake drum 15 is secured to the wheel body 14 by bolts 16 and nuts 17. On the flange of the hub 18 is mounted the internal gear ring 26 by means of a series of rivets 27.

The large spider casting 28 is rigidly attached to the wheel axle 11 by means of the key 29. In the lower portion of the spider 28 is an opening having a rotatable eccentric liner 39 therein with a bushing 40 within the liner. Within the bushing 40 the drive shaft housing 38 is free to rotate, but is restrained laterally by the collar 41 which is held firmly against the flange 43 by the bolts 42 which extend into the spider 28 through the end flange of the liner 39 and thus serve the double purpose of locking the liner 39 against rotation and securing the collar 41 against axial movement. In the outer ends of the housing 38 are the antifriction bearings 37 which support the drive shafts 50. On the end of each drive shaft 50 is fastened a driving pinion 35. The fastening in this construction is effected by splines and nut 36. The pinion accurately meshes with the ring gear 26, the eccentric liner 39 being turned to vary the distance between the axes of the shaft 50 and the wheel axle 11 until a proper tooth contact is made between the teeth, and is then locked against rotation by the bolts 42, and since the ring gear 26 is attached to the hub 18, it follows that rotation of the shaft 50 will cause the wheel to rotate at a relative speed as determined by the ratio of the number of teeth on the pinion 35 and the gear 26.

It follows that if the wheel meets with rotative resistance, and motive power is applied to the shaft 50, the pinion 35 will start to climb up around the inside of the ring gear 26 and carry with it the entire drive shaft housing. This is possible because the spider 28 can rotate upon its axis and turn the wheel axle 11 with it, the wheel axle rotating within the hub in the wheel bearings. During this climbing effect, the drive shaft housing 38 will rotate on its center with respect to the spider 28 because of its freedom of rotation within the bushing 40 which is provided for this purpose. Since there is a duplicate spider 28 on each side of the axle unit, and since each spider is keyed to the dead axle 11 it follows that any tendency to climb on one side of the axle will be duplicated and synchronized on the other side. It will be noted that if this climbing motion has taken place, the downward load imposed on the drive shaft housing will, by reason of the force of gravity, exert a turning force on the inside of the ring gear 26 tending to urge the wheel forward, and this force will be in addition to the rotative force of the pinion at the rear end of the propeller shaft 65 tending to transfer its rotative torque to the ring gear on the differential mechanism (not shown) which connects the adjacent ends of the drive shafts 50. As soon as the housing again swings down to its lowermost position, the driving action is then alone effected by the transfer of power from the above mentioned pinion to its cooperating ring gear. In normal action, the moment a slight additional resistance to the rolling of the wheels occurs, they slow up and the climbing effect takes place to assist the forward motion of the vehicle, very much like the well-known "treadmill" or "squirrel cage."

To impose the vehicle load on the drive shaft housing, arched perches are rigidly attached to the housing 38 by means of the bolts 33. These perches comprise the flanged portions 32 which are received on either side of the housing 38 as indicated in Fig. 1, and are clamped against movement to the same by the bolts 33 previously referred to. Extending forwardly and rearwardly, respectively, from the flanges 32 are the portions 22 which terminate in the portions 23 which extend upwardly from the ends of the portions 22 in converging relationship to each other, their upper ends being joined together by the portion 24 which forms a seat for the load carrying springs 60. The portions 23 of the spring perches extend upwardly and are positioned outwardly a sufficient distance from the drive shaft 50 so that ample clearance is provided for the wheel axle 11 under the same upon the swinging movement of the housing 38.

Integral with the arched perches are the bosses 58 to which are attached the radius rods 63 by the pins 59 and the radius rods are hinged to the chassis frame 62 at the brackets 64. The leaf springs 60 are attached to the seats 24 on the spring perches by means of the clips 69. The springs are connected to the frame 62 at each end of the springs by means of the shackles 61.

It will be noted that the springs 60 act to maintain the housing 38 in substantially the same relationship to the surface of the ground because they are rigidly secured to the spring perches which are in turn rigidly secured to the axle housing 38. The effect is that when a swinging movement of the housing 38 occurs and the housing 38 swings outwardly about the center of the wheels, the housing 38 is maintained in substantially horizontal position as viewed in Fig. 2, and the wheel axle 11 has a relative swinging movement about the center of the shafts 50 as a center. This will be clear upon inspection of Figs. 2 and 3 wherein it will be seen that as the housing 38 with the drive shafts 50 swings upwardly either forwardly or rearwardly, the wheel axle 11 has, in effect, a relative movement about the center of the axle shafts 50 as a center. It will be further evident that if sufficient resistance is met by the wheels, the housing 38 will swing sufficiently to bring one of the arm portions 22 of each spring perch into contact with the wheel axle 11 whereby further swinging movement of the housing 38 will be prevented. It is particularly with regard to means for preventing the wheel axle 11 in such cases from striking the spring perch at the limits of its travel with sufficient force to do any damage to the mechanism and to soften the retarding effect on the swinging movement of the housing 38 whereby the same will be brought to a stop without a perceptible shock, that the present invention deals.

The portions 22 and 23 of the spring perches are formed to a box-like section, and the inner central faces of the portions 23 are formed to provide slots 70. The side walls of the portions 22 in line with the path of movement of the wheel axle 11 in respect thereto are extended to provide wall portions 71, the edges of which are provided with outwardly turned flanges 72. Received within each pair of walls 71 is a circular block or bumper 73 of rubber or other resilient material projecting above the flanges 72 a substantial distance into the path of movement of the wheel axle 11 relative to the same. Each block 73 is provided with an eccentric opening 74 which is positioned in alignment with the opening 75 formed in each of the wall portions 71. A key 76 having a bent-over head extends through the openings 75 and 74 and receives in the end opposite the head a cotter key such as 77 for preventing inadvertent withdrawal of the same, the key 76 holding the block 73 against displacement. The block 73, being positioned in the path of movement of the wheel axle 11 relative to the axle shafts 50, engages the wheel axle 11 when the housing 38 swings far enough to bring the same into contact therewith and acts to resiliently retard the movement of the housing 38. Should the swinging movement of the housing 37 thus described be of sufficient magnitude, the block 73 may be distorted sufficiently to allow the wheel axle 11 to come into contact with the flanged portions 72 of the walls 71 which thereby serve to provide a positive limiting stop for the swinging movement of the housing 38. In order to reduce the cases wherein the wheel axle 11 might move sufficiently to come into contact with the flanges 72, I provide an additional means for checking the swinging movement of the housing 38. This means comprises spring members secured within the slots 70 of the portions 23 of each perch. Each spring member comprises a main body portion 78 which projects out of the corresponding portion 23 through the slot 70, a reversely bent end portion 79 which is secured by a bolt 80 and nut 81 to an interior face of the portions 23 adjacent the upper end thereof, and an eye portion 82 formed at the lower end thereof, the eye contacting against the adjacent inner face of the outer wall of the corresponding portion 23. The eyes thus formed are what may be termed "open eyes," that is, a space such as 83 is left between an end of the member and the adjacent body portion of the same. The body portion 78 projects into the path of movement of the wheel axle 11 relative to the housing 38 an amount increasing with the increased swinging movement of the housing 38, it projecting into such path the greatest amount at the eye 82. The effect of these springs, or, as I prefer to call them "bumpers" is that as soon as the housing 37 has swung sufficiently to bring the wheel axle 11 into contact with the body portions 78 a frictional resistance is set up between the body portions 78 and the wheel axle 11 which tends to resiliently and frictionally retard the swinging movement of the housing 38. Inasmuch as the body portion 78 of the spring members or bumpers project into the path of movement of the wheel axle 11 an amount increasing with the swinging movement of the housing 38, the resistance set up thereby to such swinging movement will increase in proportion to the same. The wheel axle 11 upon contact with the body portions 78 of each of the bumpers moves the same out of its path, each bumper bending at its upper reversely bent end to accommodate this movement. On extreme swinging movements of the housing 37 when the wheel axle 11 moves sufficiently far toward the eye 82, the eye 82 is compressed, the space 83 being first closed, and the eye 82 thereafter being deformed into an elliptical shape. It will be apparent that the force necessary to cause such deformation of these bumpers, particularly when the eye portions thereof are deformed, are relatively great, and the retarding effect exerted by these bumpers will be correspondingly great.

It will be further apparent that as soon as the wheel axle 11 comes in contact with the rubber block 73, the retarding effect on the swinging movement will be further increased, and in any event the flanges 72 on the walls 71 will provide a positive limit for such swinging movement.

While I have indicated a particular formation of the spring bumpers, it will be obvious that I do not limit my invention to the specific construction disclosed but may employ such constructions thereof as may serve the purpose herein described and explained, without material alteration of the invention involved. The particular size, shape and method of securing the rubber bumpers 73 in position may also be varied without materially affecting the present invention. It will also be apparent that if desired, friction or other devices may be secured to the wheel axle 11 at the point where it engages the spring bumpers with the same effect as herein described, and in the appended claims I mean to include in the words "wheel axle" not only the wheel axle itself, but also any such devices that may be provided thereon. It will also be apparent that if a greater amount of friction is desired between the wheel axle and spring bumpers, such bumpers may be provided with friction facings such as are employed in connection with brake shoes, but the addition of such friction means is within the skill of any ordinary person skilled in the art.

Formal changes may be made in the specific embodiment of the invention described without departing from the spirit or substance of the broad invention, the scope of which is commensurate with the appended claims.

What I claim is:

1. In combination, a wheel axle, wheels rotatably mounted on the ends thereof, supports secured to said axle, a housing rotatably mounted in said supports, eccentrically of said axle, said housing being swingable about the centers of said wheels, and means carried by said housing cooperating with said wheel axle to limit said swinging movement by frictional resistance increasing with increased swinging movement of said housing about said wheel centers, said means comprising spring members against which said axle slidably contacts.

2. In combination, a wheel axle having wheels rotatably mounted on the ends thereof, a housing supported from and eccentrically to said axle, said housing being swingable about the centers of said wheels, and means supported from said housing for damping the swinging movement of said housing, said means comprising spring members slidably contacting against said wheel axle upon a predetermined swinging movement of said housing and offering increased frictional resistance to increased swinging movement of said housing.

3. In combination, a wheel axle having wheels rotatably mounted on the ends thereof, a housing supported from and eccentrically to said wheel axle, said housing being swingable about the centers of said wheels, and means supported from said housing co-operating with said wheel axle for damping the swinging movement of said housing, said means comprising leaf springs contacting tangentially against wheel axle upon a predetermined swinging movement of said housing and deforming an amount proportional to the arc through which said housing swings to cause a corresponding frictional resistance to said swinging movement.

4. In combination, a wheel axle provided with wheels rotatably mounted on the ends thereof, a housing rotatably supported from and eccentrically to said wheel axle, said housing being swingable about the centers of said wheels, spring perches secured to said housing and extending upwardly about said wheel axle in normally spaced relationship thereto, and spring members secured to said perches adapted to contact with said wheel axle in a direction tangential thereto upon a predetermined swinging movement of said housing, said spring members extending into the path of movement of said wheel axle relative to said housing whereby to frictionally resist movement of said wheel axle upon contact therewith.

5. In combination, a wheel axle provided with wheels rotatably mounted on the ends thereof, a housing rotatably supported from and eccentric to said wheel axle, said housing being swingable about the centers of said wheels, spring perches secured to said housing and extending upwardly above said wheel axle and normally spaced therefrom, and spring members secured to said spring perches in intersecting relation with the path of movement of said wheel axle relative to said housing during swinging of said housing, said spring members each comprising a resilient strip of metal provided with a portion contacting tangentially against said wheel axle upon a predetermined swinging movement of said wheel axle and a split eye portion deformable upon a relatively great swinging movement of said housing to provide a relatively greater frictional resistance to said swinging movement.

6. In combination, a wheel axle provided with wheels rotatably mounted on the ends thereof, a housing supported from and eccentricaly to said wheel axle, said housing being swingable about the centers of said wheels, spring means fixed with respect to said housing projecting into the path of movement of said wheel axle relative to said housing whereby to frictionally resist swinging of said housing beyond a predetermined position by rubbing contact with said wheel axle, and resilient means blocking said path of movement assisting said spring means in resisting said swinging movement.

7. In combination, a wheel axle provided with wheels rotatably mounted on the ends thereof, a housing supported from and eccentrically to said wheel axle, said housing being swingable about the centers of said wheels, an arm secured to said housing, a spring secured to said arm in intersecting relation in respect to the path of movement of said wheel axle in respect to said housing, said spring contacting against said wheel axle upon a predetermined swinging movement of said housing to frictionally resist further swinging movement of said housing by rubbing contact with said wheel axle, and a resilient member carried by said arm in the path of movement of said wheel axle in respect to said housing for increasing the resistance to said swinging movement of said housing beyond a predetermined swinging movement thereof.

8. In combination, a wheel axle provided with wheels rotatably mounted on the ends thereof, a housing supported from and eccentrically to said wheel axle, said housing being swingable about the centers of said wheels, spring means supported from said housing projecting into the path of movement of said wheel axle relative to said housing for frictionally resisting swinging of said housing beyond a predetermined swinging movement thereof, resilient means supported from said housing in the path of movement of said wheel axle relative to said housing for further resisting swinging movement of said housing beyond a greater predetermined swinging movement thereof, and rigid means in the path of movement of said wheel axle relative to said housing definitely limiting the swinging movement of said housing.

9. In combination, a wheel axle, wheels carried by the ends of said axle, a housing supported from said axle in swinging relationship with respect to the centers of said wheels, a bumper, a stop, and means other than the vehicle load acting over at least thirty percent of the allowable swinging movement of said housing for frictionally resisting swinging of said housing as said stop approaches said axle.

10. In combination, a wheel axle, wheels rotatably mounted on the ends of said axle, a housing supported from said axle, said housing being swingable about the centers of said wheels, a stop for positively limiting the swinging of said housing, resilient means for resisting swinging of said housing as it approaches said stop, and additional means other than the vehicle load for resisting the swinging of said housing, said last mentioned means acting for at least thirty per-cent of the available swinging movement of said housing.

WILLIAM R. BASSICK.